(12) United States Patent
Trimeche et al.

(10) Patent No.: US 7,728,844 B2
(45) Date of Patent: Jun. 1, 2010

(54) RESTORATION OF COLOR COMPONENTS IN AN IMAGE MODEL

(75) Inventors: Mejdi Trimeche, Tampere (FI); Markku Vehviläinen, Tampere (FI)

(73) Assignee: Nokia Corporation, Espoo (FI)

( * ) Notice: Subject to any disclaimer, the term of this patent is extended or adjusted under 35 U.S.C. 154(b) by 1152 days.

(21) Appl. No.: 10/888,534

(22) Filed: Jul. 9, 2004

(65) Prior Publication Data

US 2006/0013479 A1 Jan. 19, 2006

(51) Int. Cl.
*G09G 5/02* (2006.01)
(52) U.S. Cl. ............... 345/589; 345/596; 345/601; 345/611; 382/167
(58) Field of Classification Search ........... 345/589, 345/596, 601, 611; 382/167
See application file for complete search history.

(56) References Cited

U.S. PATENT DOCUMENTS

| | | | |
|---|---|---|---|
| 5,790,709 A | 8/1998 | Kopeika et al. | |
| 5,845,010 A * | 12/1998 | Silverbrook et al. | 382/232 |
| 5,852,675 A * | 12/1998 | Matsuo et al. | 382/167 |
| 6,704,444 B2 * | 3/2004 | Yagishita et al. | 382/167 |
| 6,822,758 B1 | 11/2004 | Morino | |
| 2001/0008418 A1 * | 7/2001 | Yamanaka et al. | 348/222 |
| 2002/0008715 A1 | 1/2002 | Sorek et al. | |

FOREIGN PATENT DOCUMENTS

| | | |
|---|---|---|
| JP | 2001-197356 | 7/2001 |
| JP | 2002-300461 | 10/2002 |
| JP | 2003-060916 | 2/2003 |
| KR | 2003-0068738 | 8/2003 |

* cited by examiner

*Primary Examiner*—Matthew C Bella
*Assistant Examiner*—Mike Rahmjoo
(74) *Attorney, Agent, or Firm*—Alfred A. Fressola; Ware, Fressola, Van Der Sluys & Adolphson LLP (57) ABSTRACT

This invention relates to a method for improving image quality of a digital image captured with an imaging module comprising at least imaging optics and an image sensor, where the image is formed through the imaging optics, the image consisting of at least one color component. In the method degradation information of each color component of the image is found and is used for obtaining a degradation function. Each color component is restored by said degradation function. The image is unprocessed image data, and the degradation information of each color component can be found by a point-spread function. The invention also relates to a device, to a module, to a system and to a computer program product and to a program module.

19 Claims, 4 Drawing Sheets

RESTORATION OF COLOR COMPONENTS IN AN IMAGE MODEL

FIELD OF THE INVENTION

This invention relates to image processing and particularly to a restoration of colour components in a system for storage or acquisition of digital images.

BACKGROUND OF THE INVENTION

Blurring or degradation of an image can be caused by various factors, e.g. out-of-focus optics, or any other aberrations that result from the use of a wide-angle lens, or the combination of inadequate aperture value, focal length and lens positioning. During the image capture process, when long exposure times are used, the movement of the camera, or the imaged subject, can result in motion blurring of the picture. Also, when short exposure time is used, the number of photons being captured is reduced, this results in high noise levels, as well as poor contrast in the captured image.

Various methods for restoring images that contain defects, e.g. blurring, are known from related art. For example spatial error concealment techniques attempt to hide a defect by forming a good reconstruction of the missing or corrupted pixels. One of the methods is to find a mean of the pixels in an area surrounding the defect and to replace the defect with the mean pixel value. A requirement for the variance of the reconstruction can be added to equal the variance of the area around the defect.

Different interpolation methods can also be used for restoration. For example a bilinear interpolation can be applied to pixels on four corners of the defect rectangle. This makes a linear, smooth transition of pixel values across the defect area. Bilinear interpolation is defined by the pixel value being reconstructed, pixels at corners of the reconstructed pixel and a horizontal and vertical distance from the reconstructed pixel to the corner pixels. Another method is edge-sensitive non-linear filtering, which interpolates missing samples in an image.

The defect block can be replaced also with the average of some of all of the surrounding blocks. One example is to use three blocks that are situated above the defect. Further there is a method called "best neighbours matching" which restores images by taking a sliding block the same size as the defect region and moves it through the image. At each position, except for ones where the sliding block overlaps the defect, the pixels around the border of the sliding block are placed in a vector. The pixel values around the border of the defect are placed in another vector and the mean squared error between them is computed. The defect region is then replaced by the block that has the lowest border-pixel.

The purpose of image restoration is to remove those degradations so that the restored images look as close as possible to the original scene. In general, if the degradation process is known; the restored image can be obtained as the inverse process of the degradation. Several methods to solve for this inverse mathematical problem are known from the prior art. However, most of these techniques do not consider the image reconstruction process in the modelling of the problem, and assume simplistic linear models. Typically, the solutions in implementations are quite complicated and computationally demanding.

The methods from related art are typically applied in restoration of images in high-end applications such as astronomy and medical imaging. Their use in consumer products is limited, due to the difficulty of quantifying the image gathering process and the typical complexity and computational power needed to implement these algorithms. Some of the approaches have been used in devices that have limited computational and memory resources. The methods from the related art are typically designed as a post-processing operation, which means that the restoration is applied to the image, after it has been acquired and stored. In a post-processing operation each colour component has a different point spread function that is an important criteria that can be used to evaluate the performance of imaging systems. If the restoration is applied as post-processing, the information about the different blurring in each colour component is not relevant anymore. The exact modelling of the image acquisition process is more difficult and (in most cases) is not linear. So the "inverse" solution is less precise. Most often, the output of the digital cameras is compressed to .jpeg-format. If the restoration is applied after the compression (which is typically lossy), the result can amplify unwanted blocking artefacts.

SUMMARY OF THE INVENTION

The aim of this invention is to provide an improved way to restore images. This can be achieved by a method, a model, use of a model, a device, a module, a system, a program module and a computer program product.

According to present invention the method for forming a model for improving image quality of a digital image captured with an imaging module comprising at least imaging optics and an image sensor, where the image is formed through the imaging optics, said image consisting of at least one colour component, wherein degradation information of each colour component is found, an image degradation function is obtained and said each colour component is restored by said degradation function.

According to present invention also the model for improving image quality of a digital image is provided, said model being obtainable by a claimed method. According to the present invention also use of the model is provided.

Further according to present invention the method for improving image quality of a digital image captured with an imaging module comprising at least imaging optics and an image sensor is provided, where the image is formed through the imaging optics, said image consisting at least of one colour component, wherein degradation information of each colour component of the image is found, a degradation function is obtained according to the degradation information and said each colour component is restored by said degradation function.

Further according to present invention a system for determining a model for improving image quality of a digital image with an imaging module is provided, said module comprising at least imaging optics and an image sensor, where the image is formed through the imaging optics, said image consisting of at least one colour component, wherein the system comprises first means for finding degradation information of each colour component of the image, second means for obtaining a degradation function according to the degradation information, and third means for restoring said each colour component by said degradation function.

Further according to present invention the imaging module is provided, comprising imaging optics and an image sensor for forming an image through the imaging optics onto the light sensitive image sensor wherein a model for improving image quality is related to said imaging module. Further according to present invention a device comprising an imaging module is provided.

In addition, according to present invention the program module for improving an image quality in a device is provided, comprising an imaging module, said program module comprising means for finding degradation information of each colour component of the image, obtaining a degradation function according to the degradation information, and restoring said each colour component by said degradation function. Further the computer program product is provided, comprising instructions for finding degradation information of each colour component of the image, obtaining a degradation function according to the degradation information, and restoring said each colour component by said degradation function.

Other features of the invention are described in appended dependent claims.

In the description a term "first image model" corresponds to such an image, which is already captured with an image sensor, such as a CCD (Charged Coupled Device) or CMOS (Complementary Metal Oxide Semiconductor), but not processed in any way. The first image model is raw image data. The second image model is the one for which a degradation information has been determined. It will be appreciated that other sensor types, other than CMOS or CCD can be used with the invention.

The first image model is used for determining the blurring of the image, and the second image model is restored according to the invention. The restoration can also be regulated according to the invention. After these steps have been done, other image reconstruction functions can be applied to it. If considering the whole image reconstruction chain, the idea of the invention is to apply the restoration as a pre-processing operation, whereby the following image reconstruction operations will benefit from the restoration. Applying the restoration as a pre-processing operation means that the restoration algorithm is targeted directly to the raw colour image data and in such a manner, that each colour component is handled separately.

With the invention the blurring caused by optics can be reduced significantly. The procedure is particularly effective if fixed focal length optics is used. The invention is also applicable to varying focal length systems, in which case the processing considers several deblurring functions from a look-up table depending on the focal position of the lenses. The deblurring function can also be obtained through interpolation from look-up tables. One possibility to define the deblurring function is to use continuous calculation, in which focal length is used as a parameter to deblurring function. The resulting images are sharper and have better spatial resolution. It is worth mentioning that the proposed processing is different from traditional sharpening algorithms, which can also result in sharper images with amplified high-frequencies. In fact, this invention presents a method to revert the degradation process and to minimize blurring, which is caused e.g. by optic, whereas the sharpening algorithms use generic high-pass filters to add artefacts to an image in order to make it look sharper.

The model according to the invention is more viable for different types of sensors that can be applied in future products (because of better fidelity to the linear image formation model). In the current approach, the following steps and algorithms of the image reconstruction chain benefit from the increased resolution and contrast of solution.

Applying the image restoration as a pre-processing operation may minimize non-linearities that are accumulated in the image capturing process. The invention also may prevent over-amplification of colour information.

The invention can also be applied for restoration of video.

BRIEF DESCRIPTION OF THE DRAWINGS

The invention is illustrated with reference to examples in accompanying drawings and following description.

DETAILED DESCRIPTION OF THE INVENTION

The description of the restoration of images according to the invention can be targeted to three main points, wherein at first the blur degradation function is determined, e.g. by measuring a point-spread function (PSF) for at least one raw colour component. Secondly, a restoration algorithm is designed for at least one raw colour component. Thirdly, a regularization mechanism can be integrated to moderate the effect of high pass filtering. In the description the optics in mobile devices are used as an example, because they may generally be limited to a wide focus range. It will, however, be apparent to the man skilled in the art, that the mobile devices are not the only suitable devices. For example the invention can be utilized by digital cameras, web cameras or similar devices, as well as by high end applications. The aim of this algorithm is to undo or attenuate a degradation process (blurring) resulting from the optics. Due to the algorithm the resulting images becomes sharper and have an improved resolution.

Wherever a term "colour component" is used, it relates to various colour systems. The example in this invention is RGB-system (red, green, blue), but a person skilled in the art will appreciate other systems such as HSV (Hue, Saturation, Value) or CMYK (Cyan, Magenta, Yellow, Black) etc.

The image model in the spatial domain can be described as:

$$g_i(m,n)=h_i(u,v)*f_i(m,n)+n_i(m,n) \qquad (1)$$

where $g_i$ is a measured colour component image, $f_i$ is an original colour component, $h_i$ is a corresponding linear blurring in the colour component and $n_i$ is an additive noise term. $g_i$, $f_i$, $n_i$ are defined over an array of pixels (m, n) spanning the image area, whereas $h_i$ is defined on the pixels (u, v) spanning blurring (point-spread function) support. The index i={1, 2, 3, 4} denotes respectively the data concerning colour components, such as red, green 1, blue and green 2 colour components.

Figure 1:
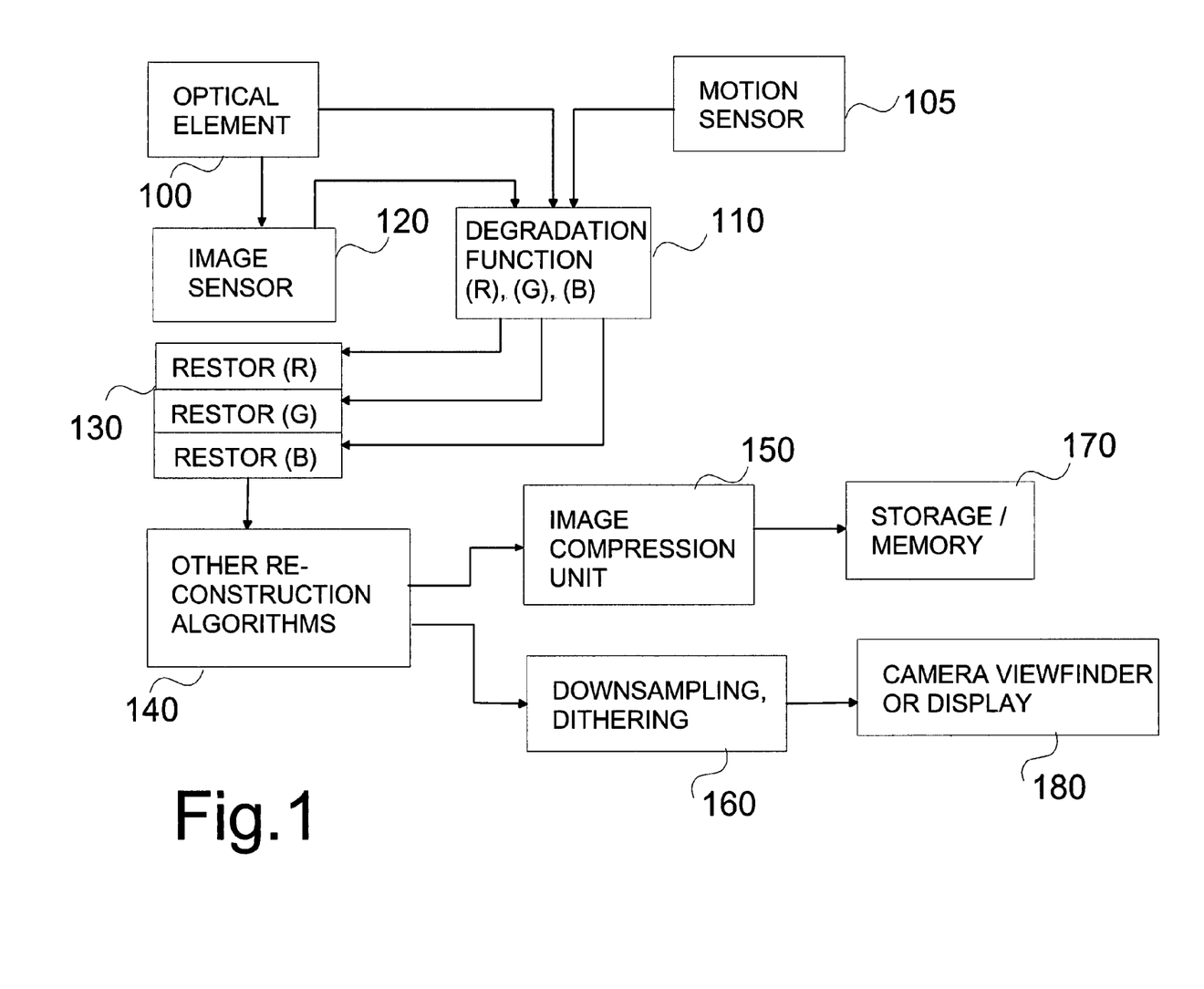
FIG. 1 illustrates an example of the system according to the invention.
Figure 2:
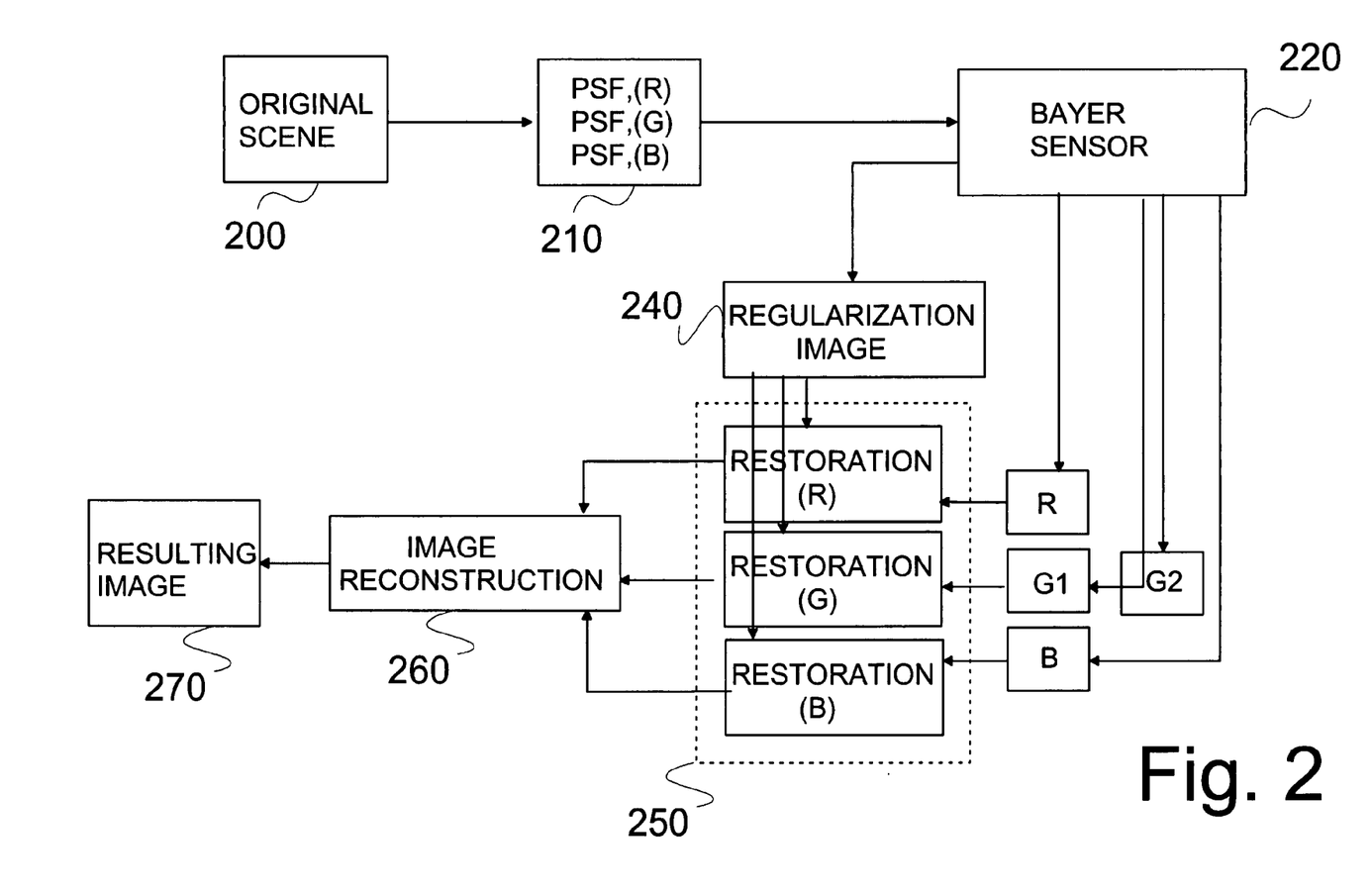
FIG. 2 illustrates another example of the system according to the invention.

The invention is described in more detail by means of FIGS. 1 and 2 each illustrating a block diagram of the image restoration system according to the invention.

Blur Specification

The procedure for estimating the degradation (FIG. 1, 110) in the image that has been captured by an optical element (100) is described next. As can be seen in FIG. 2, the degradation can be estimated by means of the point-spread function 210 corresponding to the blur in three colour channels (in this example R, G, B) (raw data). The point-spread functions are used to show different characteristics for each colour channel. The point-spread function is an important criterion that can be used to evaluate the performance of imaging systems.

The point-spread function changes as a function of the wavelength and the position in the camera field of view. Because of that, finding a good point-spread function may be difficult. In the description an out-of-focus close range imaging and a space invariant blurring are assumed. The practical procedure for estimating the point-spread function ($h_i$) that is associated with each colour component, can also be used as stand-alone application to help in the evaluation process of camera systems.

Given a blurred image corresponding to one colour component of a checker-board pattern, the four outer corner points are located manually, and first a rough estimate of the corner positions is determined. The exact locations (at subpixel accuracy) are recalculated again by refining the search within a square window of e.g. 10×10 pixels. Using those corner points, an approximation for the original grid image $f_i$ can be reconstructed by averaging the central parts of each square and by asserting a constant luminance value to those squares.

The point-spread function is assumed to be space invariant, whereby the blur can be calculated through a pseudo-inverse filtering method (e.g. in Fourier domain). Since the pseudo-inverse technique is quite sensitive to noise, a frequency low-pass filter can be used to limit the noise and the procedure can be applied with several images to obtain an average estimate of the point-spread function. (The normalized cut-off frequency of the mentioned low pass filter is around 0.6, but at least any value from 0.4 to 0.9 may be applicable).

In order to quantify the extent of blur that occurs with each colour channel, a simple statistics is defined, which statistics is determined as a mean of the weighted distance from the centre of the function (in pixels), said weight corresponding to the value of the normalized point-spread function at that point:

$$S_{psf}(h_i) = \frac{M_1 N_1}{\sum_{m,n} h_i(m,n)} \sum_{m=0}^{M_1} \sum_{n=0}^{N_1} \left(\sqrt{m^2 + n^2}\right) h_i(m,n) \quad (2)$$

wherein M1 and N1 are the support of the point-spread function filter. $S_{psf}$ describes the extent of the blurring. Experiments confirm that the channels have different blurring patterns. For example when studying Mirage −1 camera, the obtained $S_{psf}$ values were:

$$S_{psf}(h_i) = \begin{cases} 5,42 & i = 1 \text{ (red)} \\ 5,01 & i = 2 \text{ (green)} \\ 4,46 & i = 3 \text{ (blue)} \end{cases}$$

It can be seen from the results, that the red component was most blurred and noisy, whereby the least blurred was the blue component, which also had the least contrast.

Restoration Algorithm

The data concerning colour components is measured by a sensor 120 e.g. by Bayer sensor 220 (in FIG. 2), like a CMOS or CCD sensor. The colour component can be red (R), green 1 (G1) blue (B) and green 2 (G2) colour components as illustrated in FIG. 2. Each of these colour "images" is quarter size of the final output image.

The second image model is provided for to be restored (130; 250). The images are arranged lexicographically into vectors, and the point-spread function $h_i$ is arranged into a block-Toeplitz circulant matrix $H_i$. The second image model is then expressed as:

$$\bar{g}_i = H_i \bar{f}_i + \bar{\eta}_i \quad (3)$$

Having a reasonable approximation of $H_i$ the purpose of image restoration is to recover the best estimate $\hat{\bar{f}}_i$ from the degraded observation $\bar{g}_i$. The blurring function $H_i$ is non-invertible (it is already defined on a limited support, so its inverse will have infinite support), so a direct inverse solution is not possible. The classical direct approach to solving the problem considers minimizing the energy between input and simulated re-blurred image, this is given by the norm:

$$J_{LS} = \|\bar{g}_i - H_i \hat{\bar{f}}_i\|^2 \quad (4)$$

thus providing a least squares fit to the data. The minimization of the norm also leads to the solution of the maximum-likelihood, when the noise is known to be Gaussian. It also leads to the generalized inverse filter, which is given by:

$$(H^T H)\hat{\bar{f}}_i = H^T \bar{g}_i \quad (5)$$

In order to solve for this, it is common to use deterministic iterative techniques with the method of successive approximations, which leads to following iteration:

$$\hat{\bar{f}}_i^{(0)} = \mu H^T \bar{g}_i \quad (6)$$

$$\hat{\bar{f}}_i^{(k+1)} = \hat{\bar{f}}_i^{(k)} + \mu H^T \left(\bar{g}_i - \hat{\bar{f}}_i^{(k)}\right)$$

This iteration converges, if $$0 < \mu < \frac{2}{|\lambda_{max}|},$$

where $\lambda_{max}$ is the largest eigenvalue of the matrix $H^T H$. The iteration continues until the normalized change in energy becomes quite small.

It can be seen from FIGS. 1 and 2 that the restoration (130; 250) is made separately for each of the colour components R, G, B.

The main advantages of iterative techniques are that there is no need to explicitly implement the inverse of the blurring operator and that the restoration process could be monitored as it progresses.

The last squares can be extended to classical least squares (CLS) technique. When spoken theoretically, the problem of image restoration is ill-posed, i.e. a small perturbation in the output, for example noise, can result in an unbounded perturbation of the direct least squares solution that is presented above. For this reason, the constrained least squares method is usually considered in the literatures. These algorithms minimize the term in equation (4) subject to the (smoothness) regularization term, which consists of a high-pass filtered version of the output. The regularization term permits the inclusion of prior information about the image.

Regularization Mechanism

In practise, the image sensor electronics, such as CCD and CMOS sensors, may introduce non-linearities to the image, of which the saturation is one of the most serious. Due to non-linearities unaccounted for in the image formation model, the separate processing of the colour channels might result in serious false colouring around the edges. Hence the invention introduces an improved regularization mechanism (FIG. 2; 240) to be applied to restoration. The pixel areas being saturated or under-exposed are used to devise a smoothly varying coefficient that moderates the effect of high-pass filtering in the surrounding areas. The formulation of the image acquisition process is invariably assumed to be a linear one (1). Due to the sensitivity difference of the three colour channels, and fuzzy exposure controls, pixel saturation can happen incoherently in each of the colour channels. The separate channel restoration near those saturated areas results in over-amplification in that colour component alone, thus creating artificial colour mismatch and false colouring near those regions. To avoid this, a regularization mechanism according to the invention is proposed. The regularization mechanism is integrated in the iterative solution of equation (6). The idea is to spatially adapt μ in order to limit the restoration effect near saturated areas. The adapted step size is given as follows:

$$\mu_{adap}(m,n) = \beta_{sat}(u, m)\mu \quad (9)$$

where $\mu$ is the global step-size as discussed earlier, and $\beta_{sat}$ is the local saturation control that modulates the step size. $\beta_{sat}$ is obtained using the following algorithm:

for each colour channel image $g_i$, i={1 ... 4},
consider the values of the window (w x w) surrounding the pixel location $g_i(m, n)$,
count the number of saturated pixels $S_i(m,n)$ in that window.

The saturation control is given by the following equation:

$$\beta_{sat}(m, n) = \max(0, (w^2 - \Sigma_{i=1}^{4} S_i(m,n))/w^2).$$

$\beta_{sat}$ varies between 0 and 1 depending on the number of saturated pixels in any of the colour channels.

Image Reconstruction Chain

The previous description of the restoration of each of the colour component is applied as the first operation in the image reconstruction chain. The other operations (140, 260) will follow such as for example Automatic White Balance, Colour Filter Array Interpolation (CFAI), Colour gamut conversion, Geometrical distortion and shading correction, Noise reduction, Sharpening. It will be appreciated that the final image quality (270) may depend on the effective and optimized use of all these operations in the reconstruction chain. One of the most effective implementations of the image reconstruction algorithms are non-linear. In FIG. 1 the image processing continues e.g. with image compression (150) or/and downsampling/dithering (160) process. Image can be viewed (180) by camera viewfinder or display or be stored (170) in compressed form in the memory.

The use of restoration as the first operation in the reconstruction chain ensures the best fidelity to be assumed linear imaging model. The following algorithms, especially the colour filter array interpolation and the noise reduction algorithms act as an additional regularization mechanism to prevent over amplification due to excessive restoration.

Implementation

Figure 3:
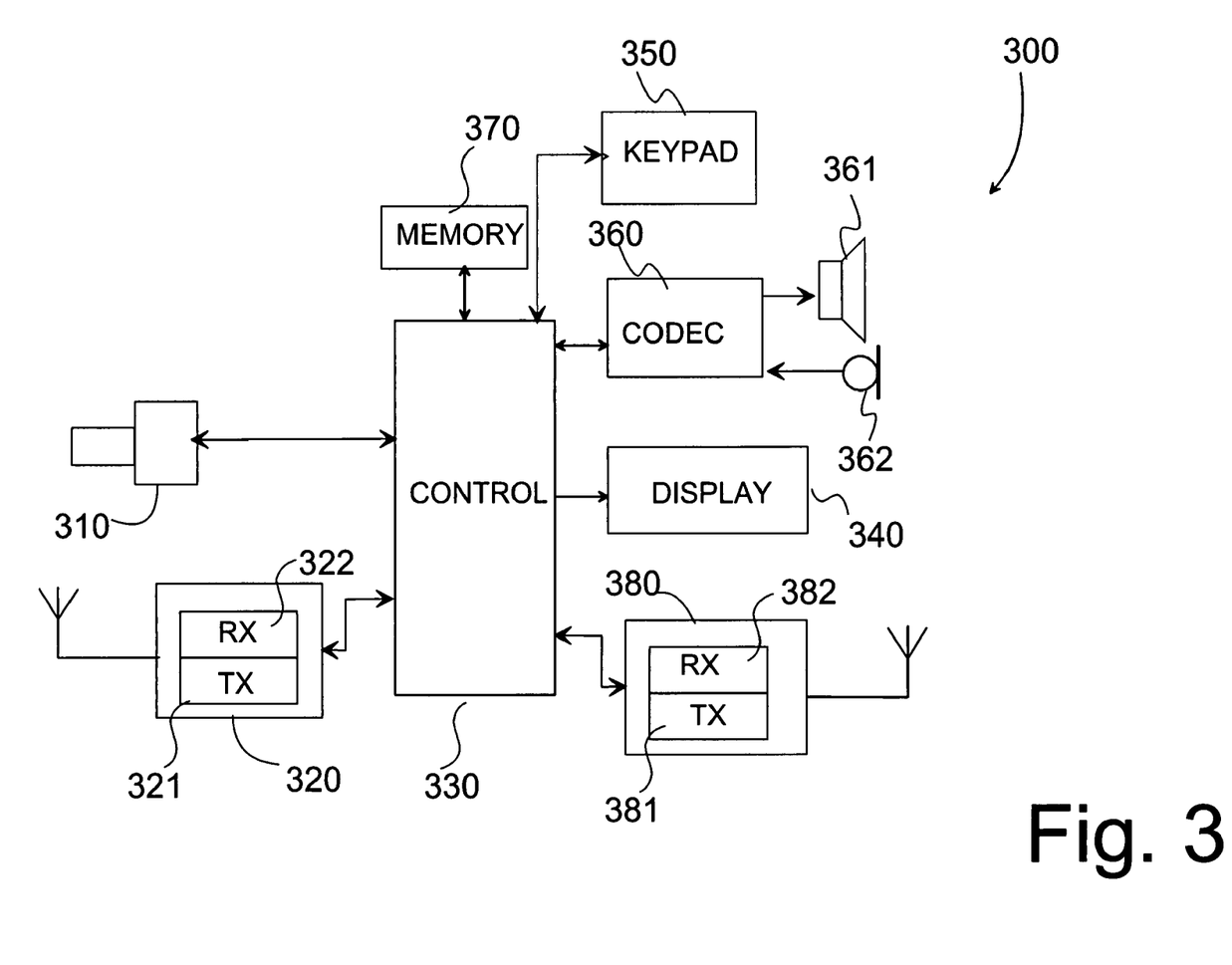
FIG. 3 illustrates an example of a device according to the invention.

The system according to the invention can be arranged into a device such as a mobile terminal, a web cam, a digital camera or other digital device for imaging. The system can be a part of digital signal processing in camera module to be installed into one of said devices. One example of the device is an imaging mobile terminal as illustrated as a simplified block chart in FIG. 3. The device 300 comprises optics 310 or a similar device for capturing images that can operatively communicate with the optics or a digital camera for capturing images. The device 300 can also comprise a communication means 320 having a transmitter 321 and a receiver 322. There can also be other communicating means 380 having a transmitter 381 and a receiver 382. The first communicating means 320 can be adapted for telecommunication and the other communicating means 380 can be a kind of short-range communicating means, such as a Bluetooth™ system, a WLAN system (Wireless Local Area Network) or other system which suits local use and for communicating with another device. The device 300 according to the FIG. 3 also comprises a display 340 for displaying visual information. In addition the device 300 comprises a keypad 350 for inputting data, for controlling the image capturing process etc. The device 300 can also comprise audio means 360, such as an earphone 361 and a microphone 362 and optionally a codec for coding (and decoding, if needed) the audio information. The device 300 also comprises a control unit 330 for controlling functions in the device 300, such as the restoration algorithm according to the invention. The control unit 330 may comprise one or more processors (CPU, DSP). The device further comprises memory 370 for storing data, programs etc.

Figure 4:
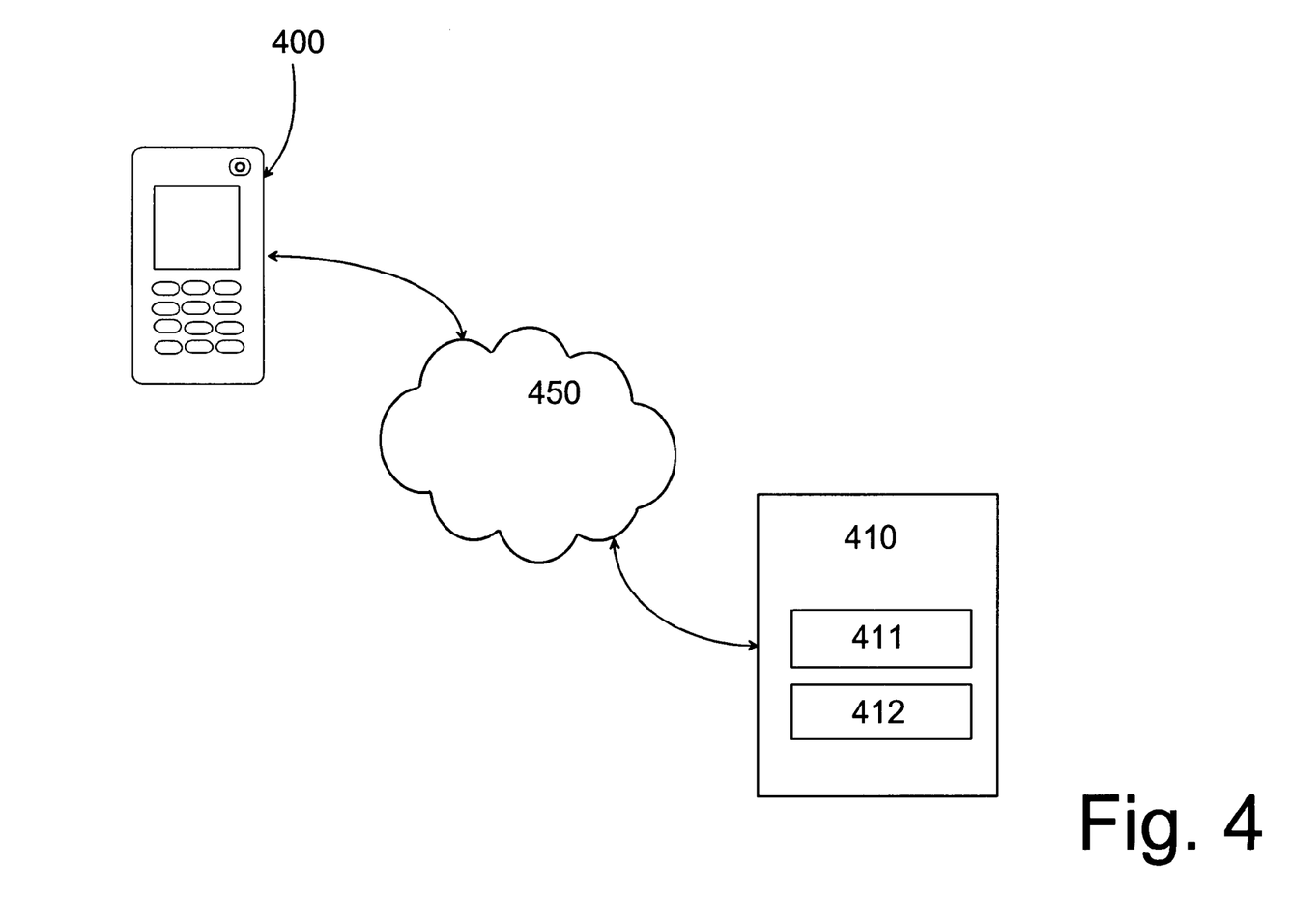
FIG. 4 illustrates an example of an arrangement according to the invention.

The imaging module according to the invention comprises imaging optics and image sensor and means for finding degradation information of each colour component and using said degradation information for determining a degradation function, and further means for restoring said each colour component by said degradation function. This imaging module can be arranged into the device being described previously. The imaging module can be also arranged into a stand-alone device 410, as illustrated in FIG. 4, communicating with an imaging device 400 and with a displaying device, which displaying device can be also said imaging device 400 or some other device, like a personal computer. Said stand-alone device 410 comprises a restoration module 411 and optionally other imaging module 412 and it can be used for image reconstruction independently. The communication between the imaging device 400 and the stand-alone device 410 can be handled by a wired or wireless network. Examples of such networks are Internet, WLAN, Bluetooth, etc.

The foregoing detailed description is provided for clearness of understanding only, and not necessarily limitation should be read therefrom into the claims herein.

What is claimed is:

1. A method comprising:
   finding degradation information of each colour component of a digital image captured with an imaging module comprising at least imaging optics and an image sensor, where the image is formed through the imaging optics, said image comprising at least one colour component,
   obtaining a degradation function according to the degradation information,
   restoring said each colour component by said degradation function, wherein the restoring of said each colour component is performed iteratively by iteratively applying the degradation function using an adapted step size in said iterative restoring, wherein the adapted step size is a function of a local saturation control that modulates a global step size, and
   applying a regularization control to each restored colour component, wherein the regularization control limits the restoration effect near regions of the digital image containing pixels that are saturated for a colour component.

2. The method according to claim 1, wherein said degradation information of each colour component is found by means of a point-spread function.

3. The method according to claim 2, wherein the restoration is implemented by an iterative restoration function being determined from the point-spread function of each colour component.

4. The method according to claim 1, wherein said image is unprocessed image data, wherein said restored colour components are further processed by other image reconstruction algorithms.

5. The method according to claim 1, wherein one of the following colour systems are used: RGB, HSV, OMYK.

6. A model for improving image quality of a digital image, said model being obtainable by a method as claimed in claim 1.

7. An imaging module comprising imaging optics and an image sensor for forming an image through the imaging optics onto the light sensitive image sensor wherein a model for improving image quality as claimed in claim 6 is related to said imaging module.

8. A device comprising an imaging module as claimed in claim 7.

9. The device according to claim 8 being a mobile device equipped with communication capabilities.

10. The method according to claim 1, wherein the adapted step size is given by the following equation:

$$\mu_{adap}(m,n)=\beta_{sat}(u,m)\mu$$

where $\mu$ is the global step size of said iterative restoring, and $\beta_{sat}$ is the local saturation control that modulates the step size.

11. The method according to claim 10, wherein $\beta_{sat}$ is obtained for each colour component for the values associated with pixels of a window surrounding a given pixel location and such that the saturation control varies between 0 and 1 depending upon the number of saturated pixels in the colour component.

12. An apparatus comprising:
a module configured to find degradation information of each colour component of a digital image captured with an imaging module comprising at least imaging optics and an image sensor, where the image is formed through the imaging optics, said image comprising at least one colour component,
a degradation function module configured to obtain a degradation function according to the degradation information,
a restoration module configured to restore said each colour component by said degradation function, wherein the restoration module is configured to restore said each colour component iteratively by iteratively applying the degradation function using an adapted step size in said iterative restoring, wherein the adapted step size is a function of a local saturation control that modulates a global step size, and
a regularization module configured to apply a regularization control to the restored colour components, wherein the regularization control limits the restoration effect near regions of the digital image containing pixels that are saturated for a colour component.

13. The apparatus according to claim 12, further comprising means for further processing said image by other image reconstruction algorithms.

14. The apparatus according to claim 12 being capable of utilizing one of the following colour systems: RGB, HSV, OMYK.

15. The apparatus according to claim 12, wherein the adapted step size is given by the following equation:

$$\mu_{adap}(m,n)=\beta_{sat}(u,m)\mu$$

where $\mu$ is the global step size of said iterative restoring, and $\beta_{sat}$ is the local saturation control that modulates the step size.

16. The apparatus according to claim 15, wherein $\beta_{sat}$ is obtained for each colour component for the values associated with pixels of a window surrounding a given pixel location and such that the saturation control varies between 0 and 1 depending upon the number of saturated pixels in the colour component.

17. An apparatus for improving image quality comprising:
an imaging module having at least imaging optics and an image sensor, where the image is formed through the imaging optics, said image comprising at least one colour component,
a module configured to find degradation information of each colour component of a digital image captured with the imaging module',
a degradation function module configured to obtain degradation function according to the degradation information,
a restoration module configured to restore said each colour component by said degradation function, wherein the restoration module is configured to restore said each colour component iteratively by iteratively applying the degradation function using an adapted step size in said iterative restoring, wherein the adapted step size is a function of a local saturation control that modulates a global step size, and
a regularization module configured to apply a regularization control to each restored colour component, wherein the regularization control limits the restoration effect near regions of the digital image containing pixels that are saturated for a colour component.

18. A computer readable memory stored with instructions for execution by at least one processor to at least perform:
finding degradation information of each colour component of a digital image captured with an imaging module comprising at least imaging optics and an image sensor, where the image is formed through the imaging optics, said image comprising at least one colour component,
obtaining a degradation function according to the degradation information,
restoring said each colour component by said degradation function, wherein the restoring of said each colour component is performed iteratively by iteratively applying the degradation function using an adapted step size in said iterative restoring, wherein the adapted step size is a function of a local saturation control that modulates a global step size, and
applying a regularization control to each restored colour component, wherein the regularization control limits the restoration effect near regions of the digital image containing pixels that are saturated for a colour component.

19. An apparatus comprising:
means for finding degradation information of each colour component of a digital image captured with an imaging module comprising at least imaging optics and an image sensor, where the image is formed through the imaging optics, said image comprising at least one colour component,
means for obtaining a degradation function according to the degradation information,
means for restoring said each colour component by said degradation function, wherein the restoring of said each colour component is performed iteratively by iteratively applying the degradation function using an adapted step size in said iterative restoring, wherein the adapted step size is a function of a local saturation control that modulates a global step size, and means for applying a regularization control to the restored colour components, wherein the regularization control limits the restoration effect near regions of the digital image containing pixels that are saturated for a colour component.

* * * * *